United States Patent
Zhou et al.

(10) Patent No.: US 11,086,832 B2
(45) Date of Patent: Aug. 10, 2021

(54) OUT OF MEMORY ERROR HANDLING FOR DATA DEFINITION LANGUAGE OPERATIONS

(71) Applicant: SAP SE, Walldorf (DE)

(72) Inventors: Panfeng Zhou, Dublin, CA (US); Colin Florendo, Malborough, MA (US); Ivan Schreter, Malsch (DE); Thorsten Glebe, Leimen (DE); David Wein, St. Paul, MN (US)

(73) Assignee: SAP SE, Walldorf (DE)

( * ) Notice: Subject to any disclaimer, the term of this patent is extended or adjusted under 35 U.S.C. 154(b) by 825 days.

(21) Appl. No.: 14/885,752

(22) Filed: Oct. 16, 2015

(65) Prior Publication Data

US 2017/0109044 A1   Apr. 20, 2017

(51) Int. Cl.
*G06F 16/22* (2019.01)
*G06F 12/00* (2006.01)

(52) U.S. Cl.
CPC .............. *G06F 16/22* (2019.01); *G06F 12/00* (2013.01)

(58) Field of Classification Search
CPC ................................. G06F 16/22; G06F 16/00
See application file for complete search history.

(56) References Cited

U.S. PATENT DOCUMENTS

| | | | | |
|---|---|---|---|---|
| 5,765,039 A * | 6/1998 | Johnson | ................ | G06F 9/4493 719/328 |
| 5,918,225 A * | 6/1999 | White | ..................... | G06F 16/30 |
| 6,449,695 B1 * | 9/2002 | Bereznyi | ............ | G06F 16/9574 711/134 |
| 2004/0268078 A1 * | 12/2004 | Hassan | ................. | G06F 9/5016 711/170 |
| 2006/0059209 A1 * | 3/2006 | Lashley | .............. | G06F 16/2358 |
| 2009/0276430 A1 * | 11/2009 | Bruso | ................. | G06F 16/2343 |
| 2010/0036890 A1 * | 2/2010 | Kawamura | ......... | G06F 11/1458 707/654 |
| 2010/0306444 A1 * | 12/2010 | Shirley | ............... | G06F 12/0802 711/6 |
| 2012/0151118 A1 * | 6/2012 | Flynn | .................. | G06F 11/1008 711/6 |
| 2015/0186051 A1 * | 7/2015 | Gurajada | .............. | G06F 3/0611 711/113 |

* cited by examiner

*Primary Examiner* — Apu M Mofiz
*Assistant Examiner* — Farhad Agharahimi
(74) *Attorney, Agent, or Firm* — Mintz Levin Cohn Ferris Glovsky and Popeo, P.C.

(57) ABSTRACT

The subject matter disclosed herein relates to out of memory error handling in a database system. A database operation can be received by an in-memory database. The database operation can be for a database object stored in a database table that can be represented as a plurality of pages that can be persisted in a page chain. The in-memory database can reserve out of memory space sufficient to load a predetermined number of pages in the page chain into memory. The in-memory database can iteratively process each page in the page chain until completion of the database operation. The iterative process can include loading the page from persistence into memory of the in-memory database, performing at least a portion of the database operation using the loaded page, and unloading the page from the memory of the in-memory database. Related apparatus, systems, techniques, and articles are also described.

15 Claims, 5 Drawing Sheets

400

405 — Allocate OOM reserved memory

410 — Start from first page in data page chain

415 — While not the end of the data page chain
{
420 — Load the current data page;
425 — Process the data page;
430 — Unload the data page;
}

*FIG. 4*

OUT OF MEMORY ERROR HANDLING FOR DATA DEFINITION LANGUAGE OPERATIONS

TECHNICAL FIELD

This disclosure relates generally to out of memory error handling arising from an out of memory error condition in a database system.

BACKGROUND

Database systems are configured to perform a variety of operations on a large number of data records. These operations can involve a variety of operations or transactions, which can require a large amount of memory resources. In situations where memory is scarce, an out of memory error condition can arise if there is insufficient memory to commit a transaction. If not handled properly, the out of memory error condition can crash the database system.

SUMMARY

In some implementations, methods and apparatus, including computer program products, are provided for out of memory error handling.

In one aspect, a database operation is received by an in-memory database. The database operation is for a database object stored in a database table that is represented as a plurality of pages that are persisted in a page chain. Out of memory space sufficient to load a predetermined number of pages in the page chain into memory is reserved by the in-memory database. Each page in the page chain is iteratively processed by the in-memory database until completion of the database operation. The iterative process includes loading the page from persistence into memory of the in-memory database, performing at least a portion of the database operation using the loaded page, and unloading the page from the memory of the in-memory database.

The above methods, apparatus, and computer program products may, in some implementations, further include one or more of the following features.

The in-memory database can perform the iteratively processing, the loading, the performing, and the unloading based on the occurrence of an out of memory error.

The predetermined number of pages can be a single page.

The database operation can be a data definition language ("DDL") operation.

The database operation can be a critical operation that prevents the database operation from being committed as a durable transaction.

The reserving, the iteratively processing, the loading, the performing, and the unloading can be implemented as one or more static functions.

The page chain can be a dictionary page chain.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

FIG. 4 is a pseudo-algorithm for resolving an out of memory ("OOM") error; and

Like reference symbols in the various drawings indicate like elements.

DETAILED DESCRIPTION

Figure 1:
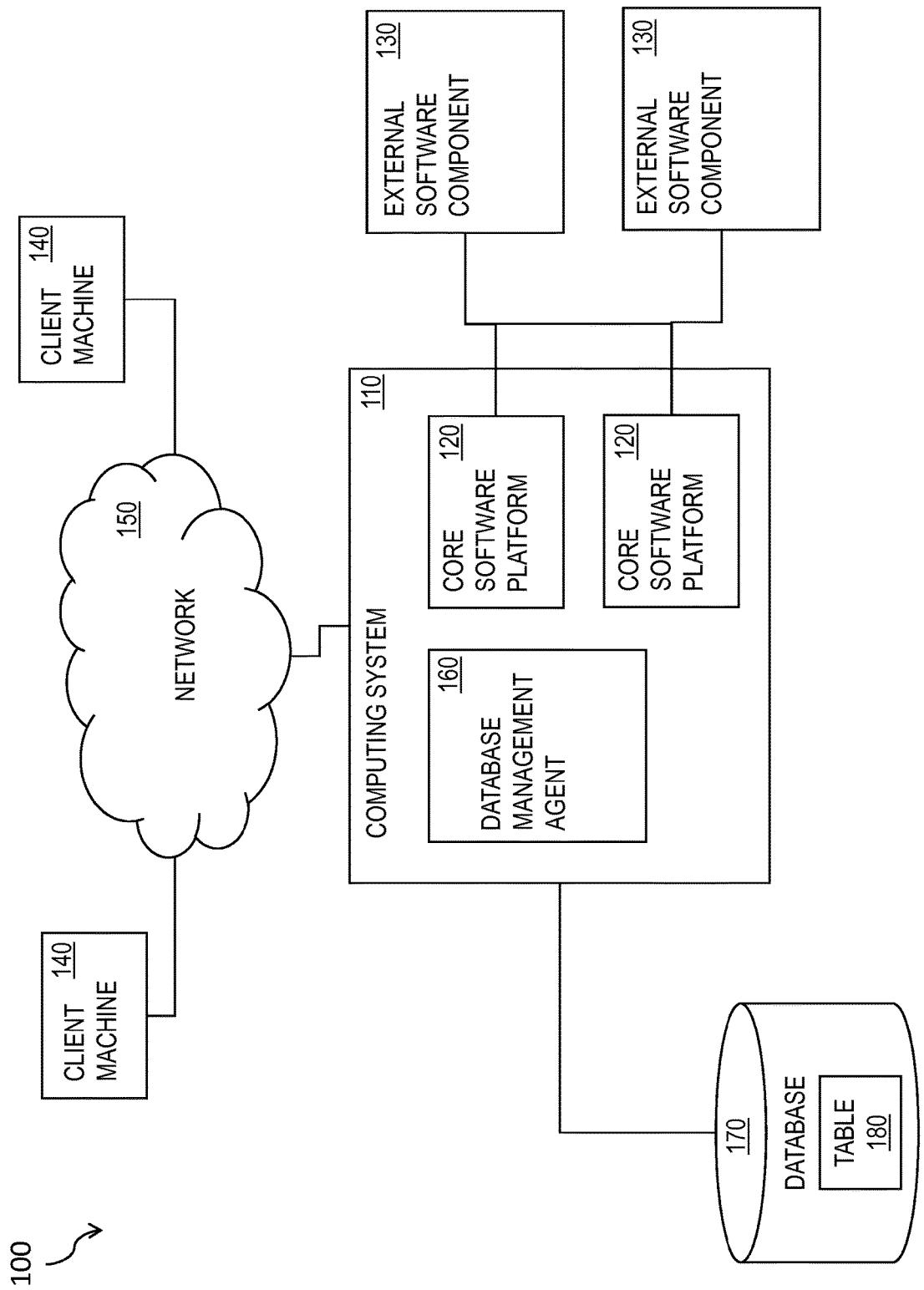
FIG. 1 is a diagram illustrating features of a business software system architecture.

FIG. 1 shows a diagram 100 of a computing system 110 that can perform the techniques disclosed herein. Computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A database management agent 160 or other comparable functionality can access a database management system 170 that stores and provides access to data (e.g. definitions of business scenarios, business processes, and one or more business configurations as well as data, metadata, master data, and the like that relate to definitions of the business scenarios, business processes, and one or more business configurations, and/or concrete instances of data objects and/or business objects that are relevant to a specific instance of a business scenario or a business process, and the like). The database management system 170 can include at least one table 180.

Figure 2:
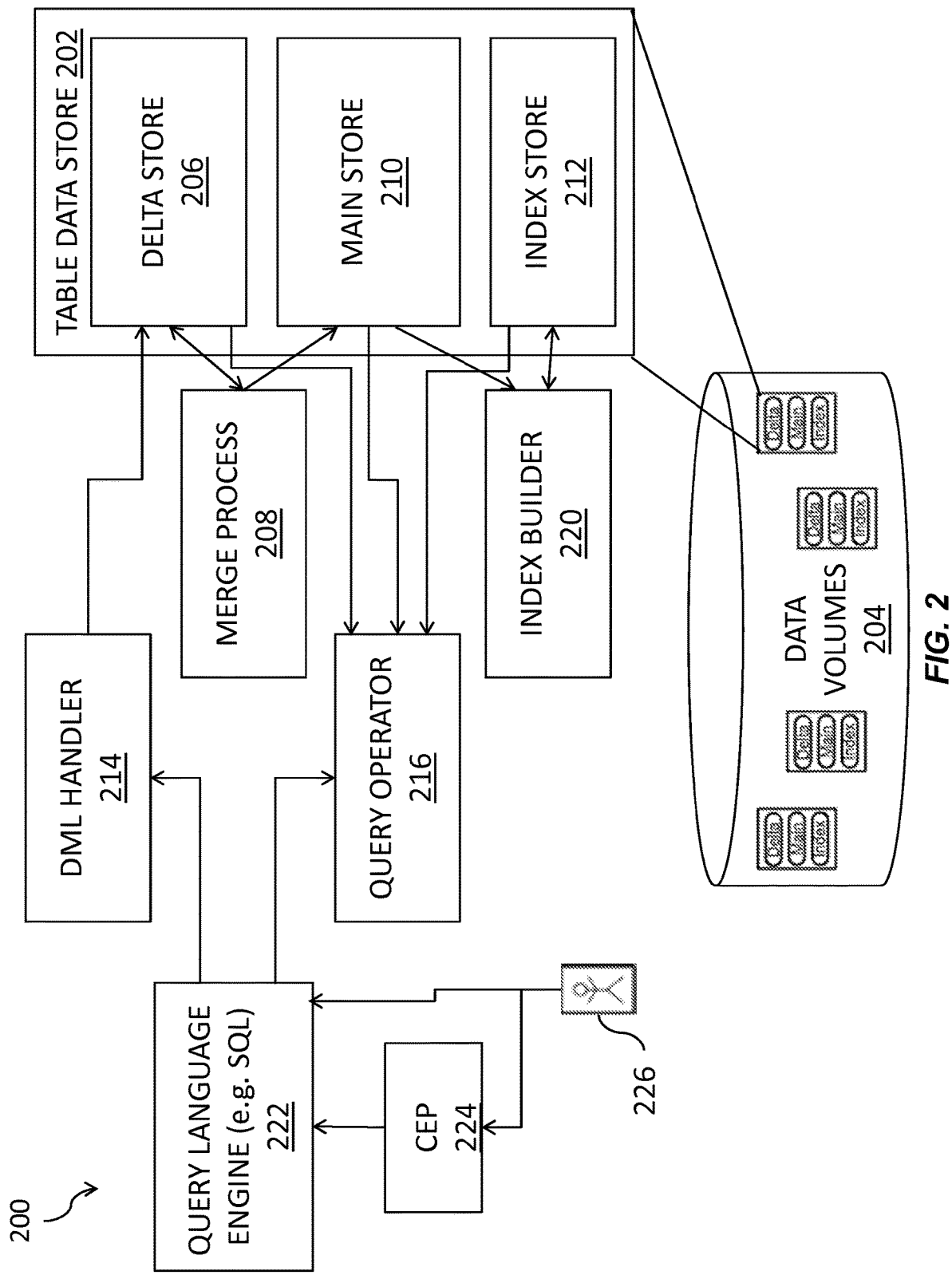
FIG. 2 is another diagram illustrating features of a business software system architecture.

FIG. 2 shows a block diagram of an architecture 200 illustrating features that can be included in a database or database management system consistent with implementations of the current subject matter. A table data store 202, which can be retained among a plurality of data volumes 204, can include one or more of a delta store 206 (e.g. a paged delta part, which can optionally be OLTP optimized and can optionally include a merge process 208), an index store 212 (e.g. one or more segmented indices), and a main store 210. The main store 210 can include a main part that is fragmented. In some implementations, the data stored in table data store 202, delta store 206, and main store 210 can be organized in columns, for example. Generally, a column store can be optimized for high performance of read operations while providing good performance for write operations. Moreover, organizing data in columns can provide efficient data compression. Delta store 206 can contain a delta container for every column, for example. Data can be stored in delta store 206 first before moving or merging the data into main store 210. Architecture 200 can also include a data manipulation language ("DML") handling module or similar functionality 214, one or more query handling modules or similar functionality 216 (e.g. including multi-version concurrency control), an index builder 220 that supports the index store 212, a query language engine 222 (which can, for example, be a SQL engine), a complex events processing module (e.g. an event handler, a stream processing module, etc.) 224 for receiving inputs from a user 226, and the like.

Figure 3:
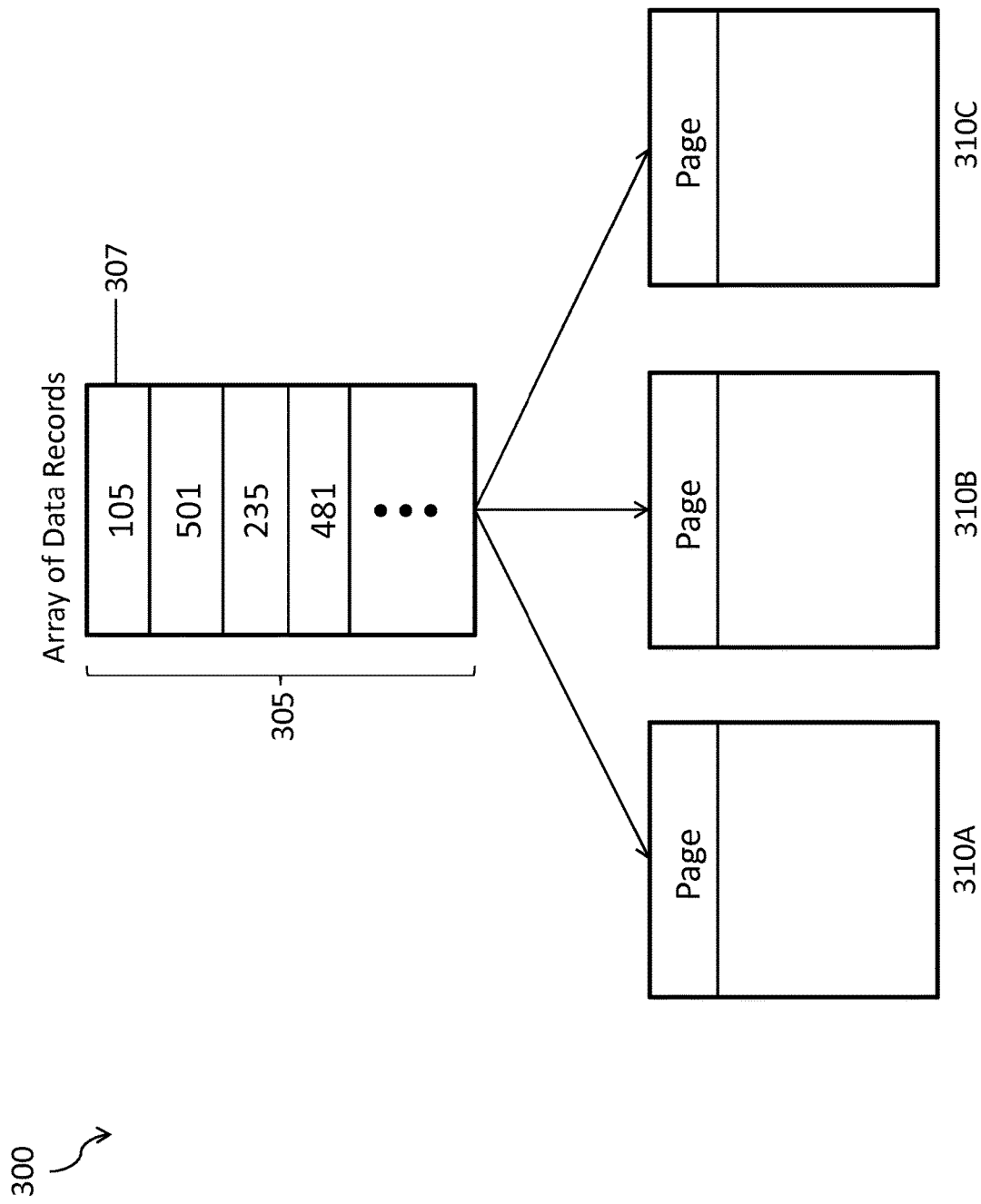
FIG. 3 is a functional block diagram of a system architecture having a memory array and an on-disk page structure.

FIG. 3 is a functional block diagram of a system architecture 300 consistent with implementations of the current subject matter. System 300 combines the benefits of a traditional disk/page based system with the fast memory access available in an in-memory database system, such as SAP's High Performance Analytic Appliance (HANA) database system. System 300 can include an in-memory array, such as memory array 305, that can store data associated with a column of a table, an entire database table, and the like. In some implementations, the memory array 305 can include contiguous blocks of memory addresses. In some implementations memory array 305 can be replaced with a different data structure, such as a tree. While memory array 305 is illustrated as having a single column in the implementation of FIG. 3, any number of columns can be included. Each memory address can store a data value (e.g., "105", "501", "235", and "481", as illustrated in FIG. 3), such as a metadata record. The memory array 305 can also include a starting memory address associated with the first element 307 in the memory array that can be stored as metadata. Once the starting memory address is known, transaction threads can quickly scan, search, or read the memory array 305 as each element in the memory array is sequentially stored at adjacent memory addresses.

System architecture 300 can mirror the memory array 305 into a separate page based layout. In the implementation of FIG. 3, the contents of memory array 305 can be written to pages 310A, 310B, and 310C, when persisting the memory array to disk. In some implementations, pages 310A, 310B, and 310C can form a page chain. A page chain can generally be characterized as a set of pages that are linked in a given order (e.g., a dictionary page chain). This page chain can be implemented as a linked list. Each fragment can optionally include a chain of pages. The term pages, as used herein, refers to a basic unit of storage in a database. A page size is generally established when the database is built and typically cannot be changed. A representative page size can be on the order of 2 kB, 4 kB, 8 kB, 16 kB, or the like. Different types of pages can store different types of database objects. For example, data pages can store data rows or columns for a table. Index pages can store index rows for one or more levels of an index. Large object (LOB) pages can store data for text and image columns, for Java off-row columns, and the like. While the implementation of FIG. 3 illustrates a single page chain, any number of page chains can be used. In some implementations, the multiple page chains can be arranged in accordance with a hierarchy.

Using pages 310A, 310B, and 310C allows system 300 to take advantage of the disk optimized features associated with a disk/page based system. Pages 310A, 310B, and 310C support a lookup mechanism that can track the location of pages in memory. This lookup mechanism can be helpful because pages 310A, 310B, and 310C may not be sequentially stored in memory. In some implementations, this lookup mechanism can use a hash table that correlates page numbers and the contents of each page to memory addresses. Because individual pages can be easily located via this lookup mechanism, system 300 can load individual pages or blocks of rows on individual pages into the memory array 305. Mirroring the memory array 305 into pages 310A, 310B, and 310C paginates the memory array in a manner that supports random access of individual pages and individual rows on pages without requiring the system 300 to serialize all of the data when loading the data back to the memory array.

During runtime, system architecture 300 can perform various operations on the data stored in memory array 305. These operations can include DDL operations that change the structure of the data stored in memory array 305. These structural changes can affect one or more database objects in the database table. For example, these operations can add a new column to the database table, delete a column from the database table, move a column within the database table or to a different database table, and the like. These operations can generally be performed directly within memory array 305. For example, if query operator 216 receives a request to add a column to a database table, this insertion can be performed directly within memory array 305. Any changes made to memory array 305 can be later persisted to one or more of pages 310A, 310B, and 310C using various materialization techniques.

In some scenarios, however, system 300 may be unable to perform an operation in memory array 305 if, for example, there is insufficient memory to provide full transactional guarantees. Full transactional guarantees refers to one or more of the following: atomicity, consistency, isolation, and durability (which is typically referred to as ACID compliance). For example, if there is insufficient memory to add a new column to a database table in memory array 305, then system architecture may generate an OOM error to indicate that this operation cannot be made durable, for example. The instant disclosure refers to these types of operations as critical operations, which can include one or more DDL operations. In some implementations, these critical operations can include one or more DML operations which can modify the data values in a column.

In order to prevent a system from crashing when an OOM error results from a critical operation, computing system 110 can reserve a fixed amount of memory (referred to herein as "OOM reserved memory") in order to perform the critical operation. When an OOM error is detected, the computing system 110 can retry the critical operation by reloading the database object involved in the operation from pages 310A, 310B, and 310C into memory array 305 using the OOM reserved memory.

The amount of OOM reserved memory that is allocated should follow several guidelines. Generally, the reserved amount should be large enough to reload the database object into memory array 305. This amount, however, is unknown, because the size of the database object can vary. For example, a database table can be spread over multiple pages of a page chain, and the number of pages associated with this object may be unknown. The page chain can be small (e.g., 2 or 3 pages) or large (e.g., 1,000 pages). Allocating a small amount of OOM reserved memory can be futile if the database object is large. The OOM error cannot be resolved if there is insufficient OOM reserved memory to accommodate the large page chain. Likewise, it is inefficient to allocate a large amount of OOM reserved memory if, for example, the database object is small. Doing so can waste unnecessary resources because the page chain may only consume a small fraction of the OOM reserved memory.

In order to resolve these issues, the implementations described herein avoid loading the entire page chain associated with the database object from persistence (i.e., pages 310A, 310B, and 310C) into the memory array. Rather, the database object is loaded in predetermined page increments. Page increments are preferred because the size of each page is a known quantity (e.g., 2 kB). Although the instant subject matter is primarily described with the use of a single page (i.e., the page increment is equal to 1), any number of pages can be used. In some implementations, the pool of available pages that can be used for OOM reserved memory can be limited.

FIG. 4 is a pseudo-algorithm 400 for resolving an OOM error consistent with the implementations described herein. Computing system 110 can execute pseudo-algorithm 400 when a critical operation results in an OOM error. This critical operation can include one or more DDL operations or structural changes to a database object. The database object may be persisted to pages 310A, 310B, and 310C.

At 405, computing system 110 can allocate OOM reserved memory in memory array 305. The amount of memory that is allocated can be a predetermined page increment (e.g., a single page). Computing system 110 can make this memory allocation when the database server is started.

At 410, computing system 110 can navigate to the first page in the data page chain associated with the database object when an OOM error occurs. For example, if an operation to move a column within a database table triggers an OOM error, then the computing system 110 can navigate to the first page associated with the database table (e.g., page 310A).

At 415, computing system 110 can determine whether it has reached the end of the data page chain associated with the database object. In the example above, computing system 110 can determine that it is currently pointing to page 310A, which is not the end of the data page chain (i.e., page 310C). Because the condition at 415 is satisfied, computing system 110 can proceed to process 420.

At 420, computing system 110 can load the current page (i.e., page 310A) from persistence into memory array 305. Loading a single page at a time resolves the memory related issues described above, which can occur when an entire page chain is loaded into memory.

At 425, computing system 110 can process the loaded page. This processing can include any functions associated with the critical operation. Continuing with the example above, computing system 110 can resume the critical operation by moving columnar data on page 310A, if any, to a new location.

At 430, computing system 110 can unload the data page from memory array 305 and loop back to process 415. Unloading the data page from memory array 305 can free up memory for the next data page. Because each data page is unloaded after it has been processed, only a single page of memory is used at any time. Of course, the amount of memory that is used can change if a different number of pages are allocated for the OOM reserved memory. If the condition at 415 is satisfied, then computing system 110 can repeat processes 420, 425, and 430 for page 310B and again for page 310C which lies at the end of the page chain.

The processes described above with respect to FIG. 4 can be implemented in a manner that reduces the amount of heap memory that is consumed. An OOM condition can arise when there is no heap memory available to instantiate an object. In order to avoid consuming heap memory, the processes of FIG. 4 can be implemented using a static function, such as a static member function. Static functions do not require heap memory because they are not attached to a particular object. Rather, a static function can be called directly by using a class name and a scope operator without instantiating an object.

Figure 5:
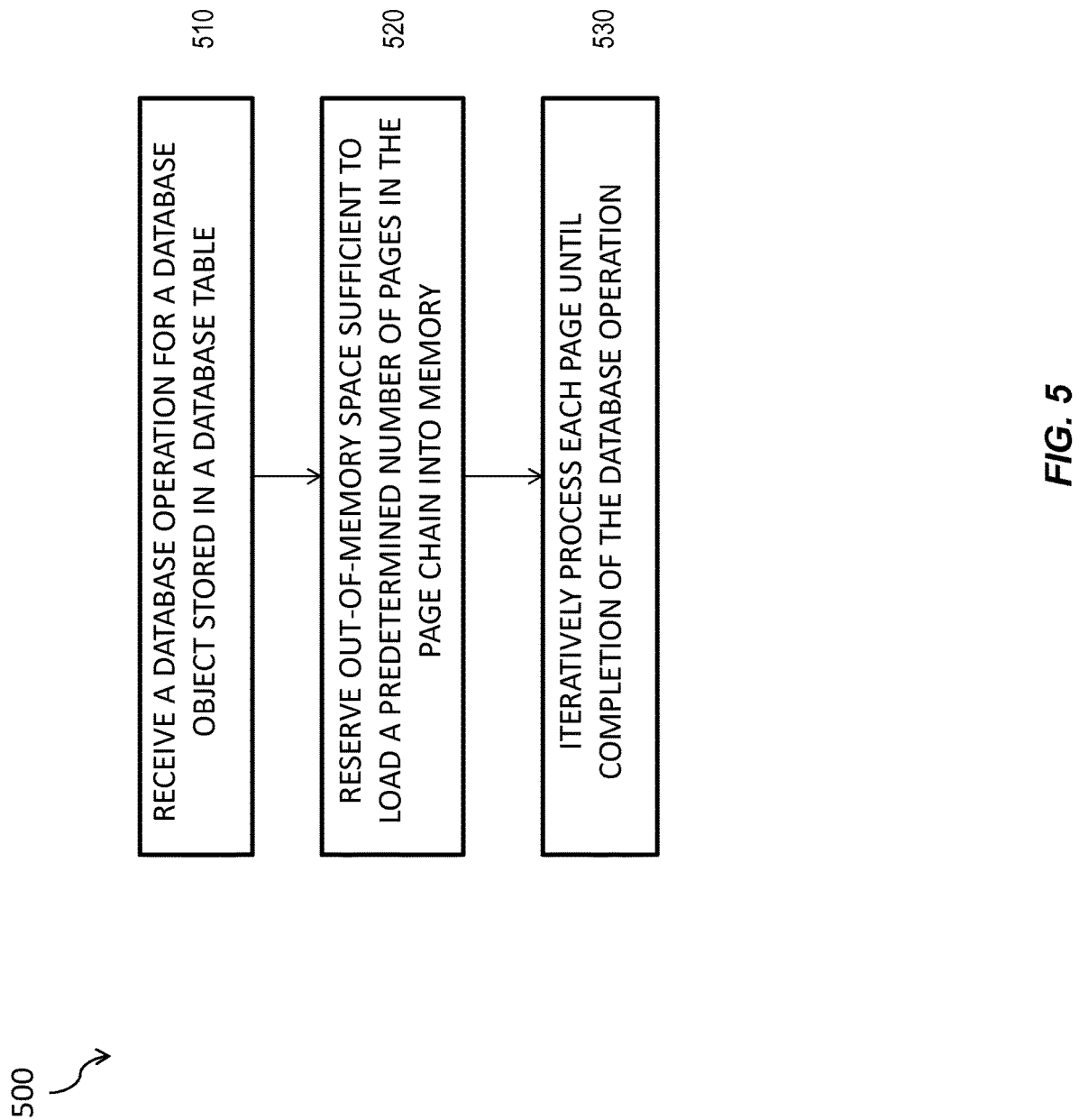
FIG. 5 is a flowchart for resolving an OOM error resulting from a critical operation.

FIG. 5 illustrates a process 500 for resolving an OOM error resulting from a critical operation. Process 500 can be performed by computing system 110, for example.

At 510, computing system 110 can receive a database operation for a database object stored in a database table. The database table can be represented as a plurality of pages that are persisted in a page chain, such as pages 310A, 310B, and 310C. The database operation can be a critical operation that prevents the database operation from being committed as a durable transaction. In some implementations, the database operation can be a DDL operation that makes structural changes to the database table. These structural changes can include, for example, adding, deleting, or moving one or more columns in the database table.

At 520, computing system 110 can reserve out of memory space sufficient to load a predetermined number of pages in the page chain into memory. In some implementations, the predetermined number of pages can be a single page.

At 530, computing system 110 can iteratively process each page in the page chain until the database operation is completed. In doing so, computing system 110 can load the page from persistence. In the implementation of FIG. 3, for example, computing system 110 can load page 310A from persistence into memory array 305. Computing system 110 can perform at least a portion of the database operation using the loaded page. For example, if the database operation involves the deletion of a column from the database table, then computing system 110 can delete data from page 310A in order to process this operation. Computing system 110 can also unload the page from memory of the in-memory database. In the implementation of FIG. 3, for example, computing system 110 can unload page 310A from memory after it is has processed the page. If computing system 110 has not reached the end of the page chain, the computing system can repeat these processes with respect to the next data page.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving, by an in-memory, column-store database, a column-based database operation for a database object to be stored in a memory array in a memory of the in-memory, column-store database, the column-based database operation changing a structure of at least a column of the in-memory, column-store database, the structure changed by at least one of a column addition, a column deletion, and a column move, the memory array having content mirrored to an associated plurality of pages persisted in a persistent storage as a page chain which can be read from and written to the memory array;
   reserving, by the in-memory, column-store database, out of memory space in the memory array sufficient to load a predetermined number of pages in the page chain from the persistent storage into the reserved out of memory space portion of the memory array stored in the memory;
   in response to not receiving an insufficient memory error caused by the column-based database operation changing the structure of at least the column of the in-memory, column-store database, processing, within the memory array and without accessing the persistent storage, the column-based database operation by at least one of the column addition, the column deletion, and the column move; and
   in response to the insufficient memory error caused by the column-based database operation changing the structure of at least the column of the in-memory, column-store database, iteratively processing, by the in-memory, column-store database, each page in the page chain until completion of the column-based database operation changing the structure of at least the column of the in-memory, column-store database, the iteratively processing comprising:
      loading the predetermined number of pages from the persistent storage into the reserved out of memory space portion of the memory array stored in memory of the in-memory, column-store database,
      performing at least a portion of the column-based database operation using the loaded predetermined number of pages, and unloading, upon completion of the at least the portion of the column-based database operation being performed using the loaded predetermined number of pages, the predetermined number of pages from the reserved out of memory space portion of the memory array stored in memory of the in-memory, column-store database, wherein the iteratively processing is repeated until an end of the page chain is reached.

2. The computer-implemented method of claim 1, wherein the predetermined number of pages is a single page.

3. The computer-implemented method of claim 1, wherein the database operation is a data definition language operation.

4. The computer-implemented method of claim 1, wherein the database operation is a critical operation that prevents the database operation from being committed as a durable transaction.

5. The computer-implemented method of claim 1, wherein the reserving, the iteratively processing, the loading, the performing, and the unloading are implemented as one or more static functions.

6. A system comprising:
at least one processor; and
at least one memory, wherein the at least one processor and the at least one memory are configured to perform operations comprising:
receiving, by an in-memory, column-store database, a column-based database operation for a database object to be stored in a memory array in a memory of the in-memory, column-store database, the column-based database operation changing a structure of at least a column of the in-memory, column-store database, the structure changed by at least one of a column addition, a column deletion, and a column move, the memory array having content mirrored to an associated plurality of pages persisted in a persistent storage as a page chain which can be read from and written to the memory array;
reserving, by the in-memory, column-store database, out of memory space in the memory array sufficient to load a predetermined number of pages in the page chain from the persistent storage into the reserved out of memory space portion of the memory array stored in the memory;
in response to not receiving an insufficient memory error caused by the column-based database operation changing the structure of at least the column of the in-memory, column-store database, processing, within the memory array and without accessing the persistent storage, the column-based database operation by at least one of the column addition, the column deletion, and the column move; and
in response to the insufficient memory error caused by the column-based database operation changing the structure of at least the column of the in-memory, column-store database, iteratively processing, by the in-memory, column-store database, each page in the page chain until completion of the column-based database operation changing the structure of at least the column of the in-memory, column-store database, the iteratively processing comprising:
loading the predetermined number of pages from the persistent storage into the reserved out of memory space portion of the memory array stored in memory of the in-memory, column-store database,
performing at least a portion of the column-based database operation using the loaded predetermined number of pages, and
unloading, upon completion of the at least the portion of the column-based database operation being performed using the loaded predetermined number of pages, the predetermined number of pages from the reserved out of memory space portion of the memory array stored in memory of the in-memory, column-store database
wherein the iteratively processing is repeated until an end of the page chain is reached.

7. The system of claim 6, wherein the predetermined number of pages is a single page.

8. The system of claim 6, wherein the database operation is a data definition language operation.

9. The system of claim 6, wherein the database operation is a critical operation that prevents the database operation from being committed as a durable transaction.

10. The system of claim 6, wherein the reserving, the iteratively processing, the loading, the performing, and the unloading are implemented as one or more static functions.

11. A non-transitory computer-readable medium containing instructions to configure a processor to perform operations comprising:
receiving, by an in-memory, column-store database, a column-based database operation for a database object to be stored in a memory array in a memory of the in-memory, column-store database, the column-based database operation changing a structure of at least a column of the in-memory, column-store database, the structure changed by at least one of a column addition, a column deletion, and a column move, the memory array having content mirrored to an associated plurality of pages persisted in a persistent storage as a page chain which can be read from and written to the memory array;
in response to not receiving an insufficient memory error caused by the column-based database operation changing the structure of at least the column of the in-memory, column-store database, processing, within the memory array and without accessing the persistent storage, the column-based database operation by at least one of the column addition, the column deletion, and the column move;
in response to the insufficient memory error caused by the column-based database operation changing the structure of at least the column of the in-memory, column-store database, iteratively processing, by the in-memory, column-store database, each page in the page chain until completion of the column-based database operation changing the structure of at least the column of the in-memory, column-store database, the iteratively processing comprising:
loading a predetermined number of pages from the persistent storage into a reserved out of memory space portion of the memory array stored in memory of the in-memory, column-store database,
performing at least a portion of the column-based database operation using the loaded predetermined number of pages, and
unloading, upon completion of the at least the portion of the column-based database operation being performed using the loaded predetermined number of pages, the predetermined number of pages from the reserved out of memory space portion of the memory array stored in memory of the in-memory, column-store database.

12. The non-transitory computer-readable medium of claim 11, wherein the predetermined number of pages is a single page.

13. The non-transitory computer-readable medium of claim 11, wherein the database operation is a data definition language operation.

14. The non-transitory computer-readable medium of claim 11, wherein the database operation is a critical operation that prevents the database operation from being committed as a durable transaction.

15. The non-transitory computer-readable medium of claim 11, wherein the reserving, the iteratively processing, the loading, the performing, and the unloading are implemented as one or more static functions.

\* \* \* \* \*